Dec. 4, 1951     D. W. BERGDORF     2,577,507
CATCH
Filed July 15, 1949
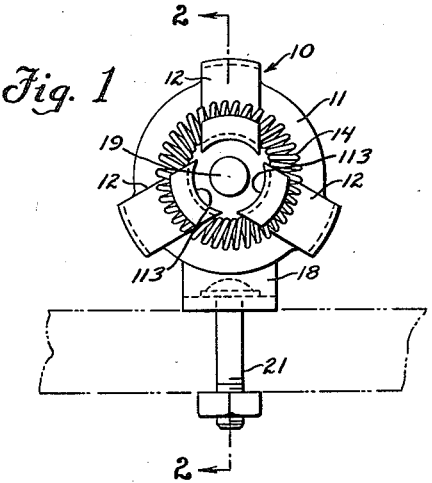
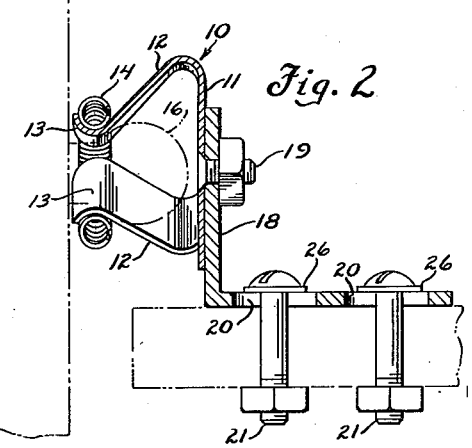
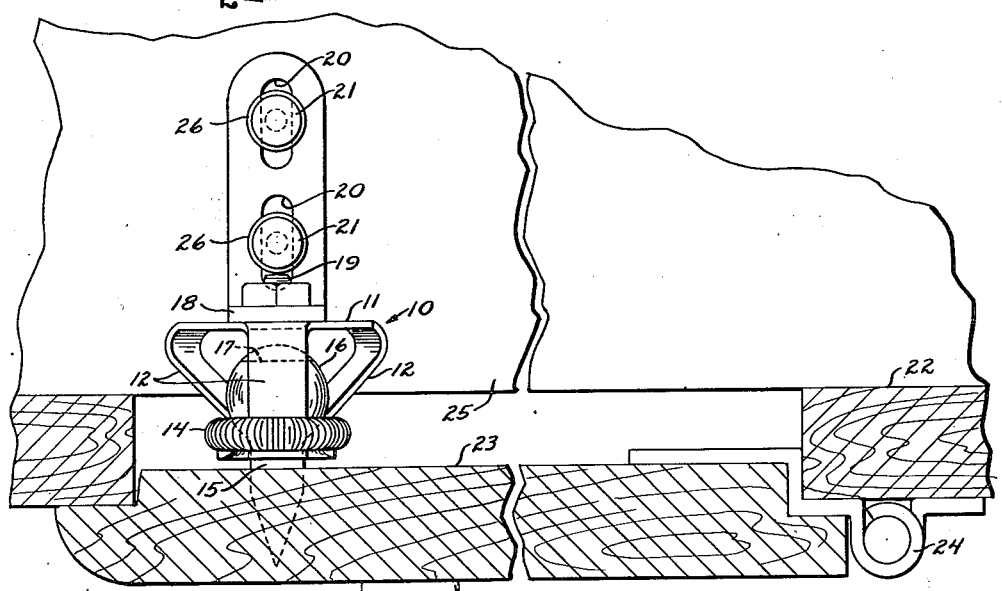
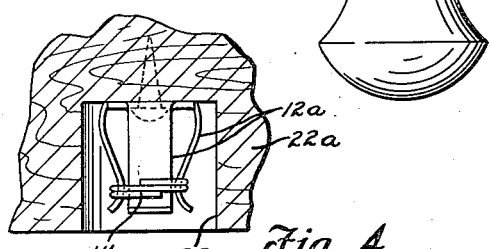
INVENTOR.
Dale W. Bergdorf
BY
Oldham & Oldham
ATTORNEYS Patented Dec. 4, 1951

2,577,507

UNITED STATES PATENT OFFICE 2,577,507

CATCH

Dale W. Bergdorf, Barberton, Ohio

Application July 15, 1949, Serial No. 104,995

4 Claims. (Cl. 292—17)

This invention relates to a catch or latch construction such as is used to secure cabinet or cupboard doors in closed position.

Heretofore there have been countless different kinds of catches or latches provided for releasably securing two relatively movable members in an associated or closed position whereas the catch will permit ready disengagement of the same for moving the relatively movable members to an open or different position than the latched or closed position of same. These previous types of latch construction, insofar as I am aware, have all been relatively complicated whereby such devices are relatively expensive. A further disadvantage of many types of catches or latches previously provided has been that it has been impossible to adjust such a device in order to compensate for slight errors in the original positioning of the device so that a fresh start would have to be made in positioning the catch in a desired exact location. In such re-positioning operations, the holes made in the original positioning effort frequently interfere with the desired accurate re-positioning of the different components of the catch device.

A general object of the present invention is to avoid and overcome the foregoing and other disadvantages attendant the use of previous types of catch constructions, and to provide a catch which is characterized by the adjustability of same.

Yet a further object of the invention is to provide an inexpensive catch which provides a positive securing action, when desired.

Yet a further object of the invention is to provide a catch which is made from two different parts and which is easy to install and which has a long operative life.

A further object of the invention is to provide a catch which has one member thereof that has a plurality of engaging fingers extending upwardly and inwardly therefrom and which has a resilient member in association therewith for resiliently urging the end portions of the engaging fingers into immediately adjacent relationship.

A further object of the invention is to provide a positioning bracket for one member of the catch whereby such catch member may be moved along the longitudinal axis of the second component of the catch to facilitate an accurate positioning of the two relatively movable members of the catch.

The foregoing and other objects and advantages of the invention will be made more apparent as the specification proceeds. For a better understanding of the present invention, one presently best known embodiment of the invention is shown in the accompanying drawings wherein:

Fig. 1 is an elevation of one portion of the catch device of the invention with such member being indicated as being carried on a support;

Fig. 2 is a side elevation of the catch member of Fig. 1 with the complementary catch member being indicated engaged therewith;

Fig. 3 is a plan view of the catch unit of the invention showing it in its operative position; and Fig. 4 is a plan view of a modification of the invention, and on somewhat smaller scale.

For a better understanding of the present invention, reference should be had to the details of the construction shown in the drawing and there is shown a catch or latch 10 which includes a base plate 11 that is adapted to be secured to one of the relatively movable members, usually the stationary member, desired to be retained in a closed or fixed position by use of the catch device of the invention. This base plate 11 may be made from any suitable material and it has a plurality of engaging fingers 12 extending therefrom. These fingers 12 usually are formed integrally with the base plate 11 and extend in a direction which may be considered to be upwardly and inwardly with relation to the base plate 11. Fig. 2 of the drawings best shows that the fingers 12 are outwardly flared at 13 at their end portion.

As an important feature of the present invention, the engaging fingers 12 are resiliently and constantly urged into immediate association with each other by means of a resilient member, such as a coil spring 14 that is in constant and tight association with the flared ends 13 of the fingers 12. Thus these fingers 12 which inherently and preferably have a certain amount of resiliency, are prevented from ever being sprung out of shape such as would prevent functioning of the base plate and fingers as a portion of the catch. Usually the base plate and fingers are made from a suitable metallic material whereby the durability and resiliency desired will inherently be secured in this portion of the catch.

The end portions of the fingers 12 are adapted to engage resiliently with a spherical or round headed member such as a screw 15 which has a round head 16 provided thereon. Preferably the head 16 is provided with a slot 17 so that the screw 15 can be readily engaged with a tool, such as a screw driver, to be secured into position. However, if desired the head 16 may merely be provided on the end of any type of a pointed nail, or other member or on a stud on a base plate, which is adapted for ready engagement with one of two relatively movable members, such as a cabinet door 23, which may be made from any conventional material.

Another important element of the present invention is a right angle bracket 18 for securing the base plate 11 and means associated therewith in a desired position with relation to the support provided therefor. This bracket 18 is shown having a bolt 19 extending through one leg thereof and engaging with the base plate 11 so as to position the same fixedly on the bracket 18. The other leg of the bracket 18 is shown as having slots 20 formed therein through which bolts or screws 21 extend for securing the bracket 18 in an adjustable relation to its support. Movement of the bracket 18 with relation to the slots 20 provides an adjustment of the base plate 11 along the longitudinal axis of the screw 15 or other comparable member used in the catch 10. Fig. 3 of the drawing shows the catch 10 positively secured in an operative position. Thus a cabinet 22 is shown which has a door 23 pivotally secured thereto in a conventional manner as by use of hinges 24. The screw 15 is then secured to the door 23 in a desired position and the base plate 11 of the catch and the bracket 18 are then in turn secured to a shelf 25 formed in the cabinet 22. It will be seen that the base plate 11 can be moved or adjusted with relation to the screw 15 so that the engaging fingers 12 and the flared ends thereof can be placed in a desired accurate relationship with the head 16 of the screw to connect with a desired engagement and release action therebetween when the door 23 is opened or closed. This adjustment is of particular advantage in insuring that the door can thereby be closed to the exact position desired with the catch fully and properly engaged. Preferably the slot 20 is made of greater width than the body of bolt 21 to permit adjustment of the base plate 11 in a lateral direction, as well as a longitudinal direction, with relation to the screw 15, and with a washer 26 under each bolt head.

It also should be noted that in some instances, it may be desired to secure the base plate 11 directly to one of the members with which the catch 10 is associated. In such instances then the bolt 19 would be replaced by a positioning screw which would normally merely extend into the cabinet, shelf or other member with which such base plate is to be fixedly associated.

From the foregoing, it should be apparent that a catch has been provided which is adapted to have a resilient engagement between the two components of the catch and with the catch being constructed from relatively inexpensive components that are adapted to have a long service life. But in particular, the improved catch of the invention has a great deal more latching power than the standard spring latch sold today for cupboard use. With a conventional type latch, if the cupboard door warps a little, as it often does when made from plywood, the latch is useless. On the other hand, the catch of the invention will still function and operate even if the catch must take and hold the warp out of the door. Thus, the objects of the invention are achieved.

Any desired number of fingers 12 may be provided in the catch 10, but three such retaining fingers has been found to give excellent engagement action. Preferably the ends 13 of the fingers 12 are formed of substantially concave shape in cross section, as indicated by the numeral 113. Such concavity of the ends of the fingers facilitates smooth engagement thereof with the ball head 16. It will be noted that the fingers 12 extend sufficiently far from the base plate 11 as to permit the entire head 16 to be inserted into the enclosure formed by the fingers 12 whereby a reduced diameter portion of the screw 15 is positioned immediately between the flared ends 13 and provides a resilient engagement between the fingers 12 and the head 16 which then would require a considerable force or exertion to be forced into or out of engagement with the fingers 12. The strength of the spring 14 determines the latching and unlatching strength or load of the catch, it being understood that several springs of different tensile strength can be available for substitution and use of the spring 14 best adapted for the particular job.

The modification of the invention shown in Fig. 4 of the drawings differs from the form heretofore described primarily in the use of spring ring 14a having several helical turns, all turns surrounding all legs 12a of the clip. The spring 14a is very inexpensive, and merely by increasing or decreasing the number of turns, its strength can be adjusted to provide the latching factor desired. Furthermore, the legs 12a are kept closer together to keep the entire clip small and compact, in fact, sufficiently compact so that the clip, dependent upon its exact size, can be received in a three-eighths to five-eighths inch hole 30 formed in a shelf 22a or other relatively movable member.

While several embodiments of the invention have been disclosed herein, it will be appreciated that modifications thereof may be resorted to without departing from the spirit and scope of the invention as defined by the appended claims.

Having thus described my invention, what I claim is:

1. In a catch or the like, a base plate, three substantially S-shaped resilient fingers integrally formed with said base plate and extending upwardly and inwardly in relation thereto whereby the ends are normally adjacent each other, said S-shaped fingers being outwardly flared at their ends, a spring ring having two complete helical turns, each complete turn engaging all of the fingers whereby contraction of the turns urges the ends of said fingers towards each other.

2. In a catch or the like, a base plate, a plurality of resilient fingers integrally formed with said base plate and extending upwardly and inwardly in relation thereto whereby the ends are normally adjacent each other, said fingers being outwardly flared at their ends, a spring ring having a plurality of helical turns, each complete turn engaging all of the fingers whereby contraction of the turns urges the ends of said fingers towards each other.

3. In a catch or the like, a base plate, a plurality of fingers positioned by said base plate and extending upwardly with relation thereto, said fingers being outwardly flared at their ends, and a spring ring having more than one complete turn with each turn engaging all of the outer surfaces of said fingers adjacent the ends thereof whereby said spring ring resiliently restrains said fingers from separating movement.

4. In a catch or the like, a base plate, a plurality of resilent fingers positioned by said base plate and extending upwardly and inwardly with relation thereto, said fingers being outwardly flared at their ends, and a spring ring having more than one complete turn with each turn engaging all of the outer surfaces of said fingers adjacent the ends thereof, said spring ring being seated on said fingers in a bent portion thereof provided by the outward flaring of said fingers.

DALE W. BERGDORF.

REFERENCES CITED

The following references are of record in the file of this patent:

UNITED STATES PATENTS

| Number | Name | Date |
|---|---|---|
| 109,342 | Phillips | Nov. 15, 1870 |
| 431,721 | Jacobs | July 8, 1890 |
| 1,111,759 | Parker | Sept. 29, 1914 |
| 1,732,940 | Larson | Oct. 22, 1929 |

FOREIGN PATENTS

| Number | Country | Date |
|---|---|---|
| 4,761 | Great Britain | Mar. 3, 1896 |
| 737,387 | France | Oct. 3, 1932 |